BLEND CONTROL DEVICE
Filed Dec. 28, 1966 2 Sheets-Sheet 1
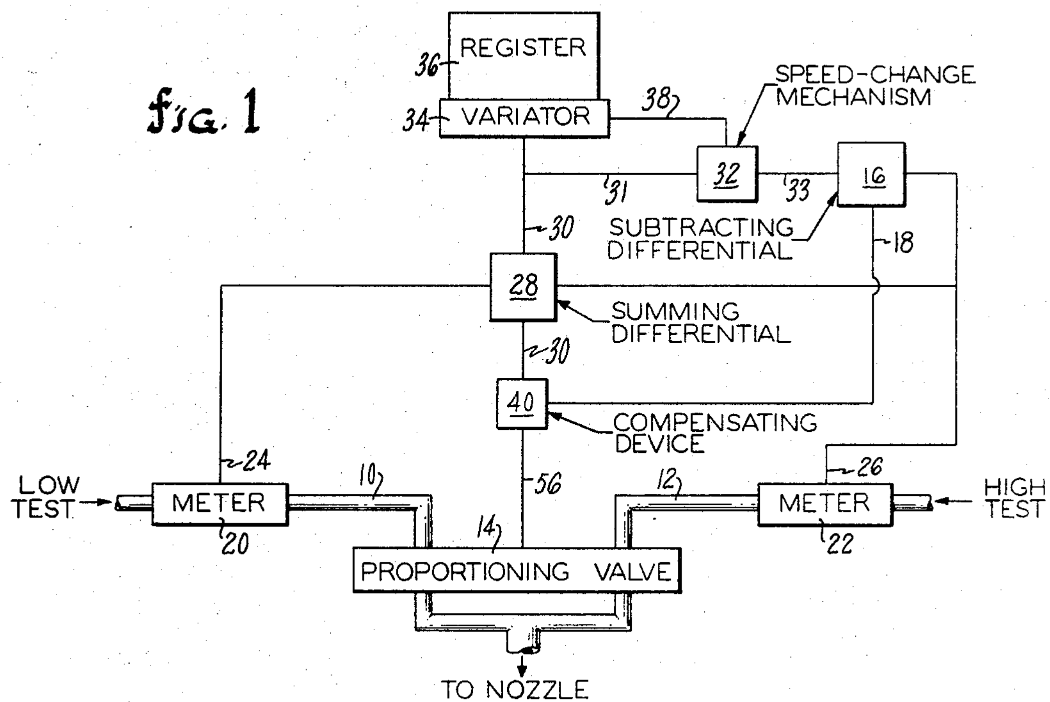
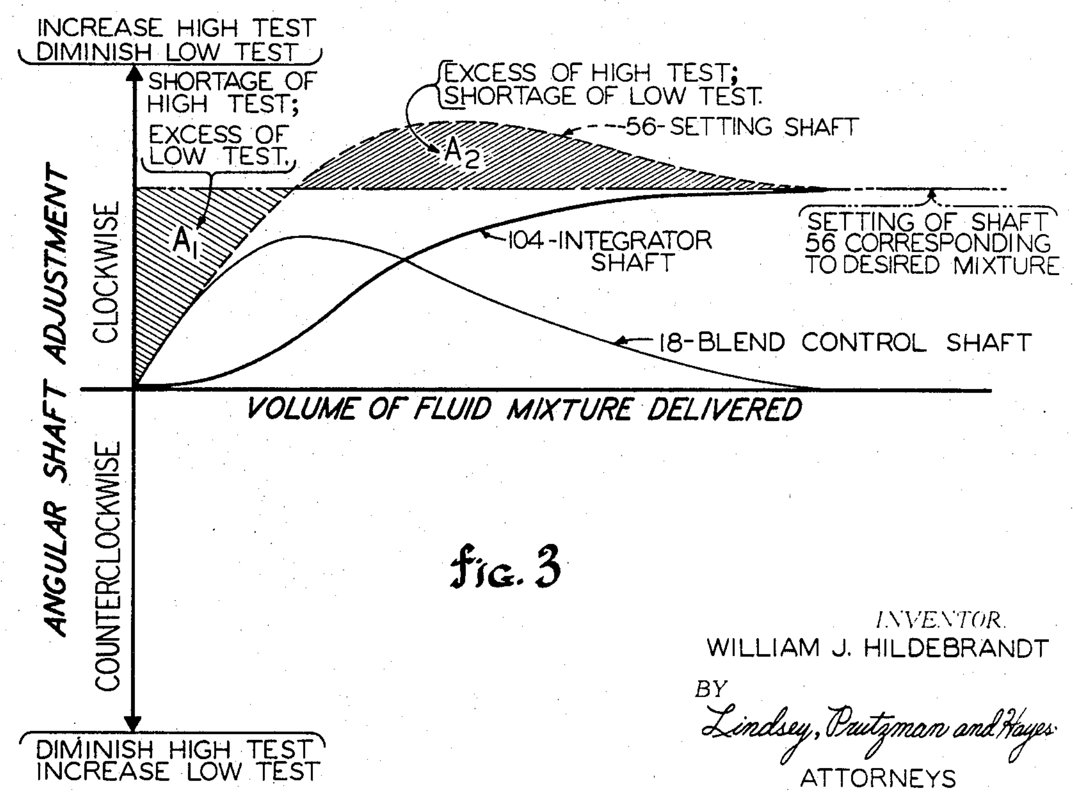
INVENTOR.
WILLIAM J. HILDEBRANDT
BY
Lindsey, Prutzman and Hayes
ATTORNEYS

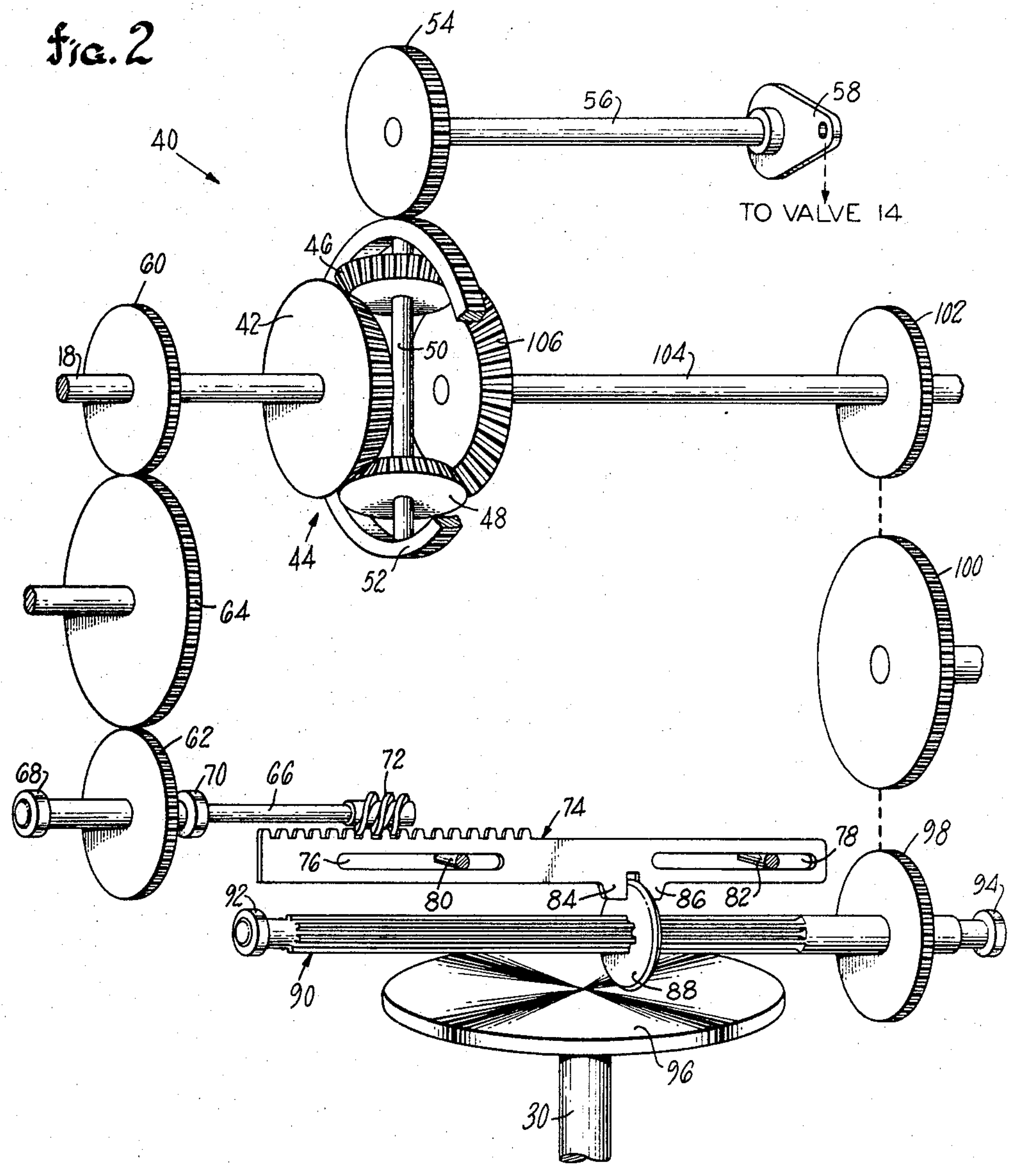
INVENTOR.
WILLIAM J. HILDEBRANDT
BY
Lindsey, Prutzman and Hayes
ATTORNEYS United States Patent Office 3,416,552
Patented Dec. 17, 1968

3,416,552
BLEND CONTROL DEVICE

William J. Hildebrandt, Simsbury, Conn., assignor to Veeder Industries Inc., Hartford, Conn., a corporation of Connecticut Filed Dec. 28, 1966, Ser. No. 605,270
18 Claims. (Cl. 137—98)

ABSTRACT OF THE DISCLOSURE

A blend control device usable in a fluid dispensing apparatus for delivering variable preselected mixtures of fluids and having a compensating device connected between a blend control shaft and a proportioning valve to effect proper delivery of a desired mixture substantially free of blend error irrespective of the relative proportioning of the fluids of a prior delivery.

The present invention generally relates to fluid dispensing apparatus adapted for dispensing a mixture or blend of fluids, for example relatively high and low grades of gasoline, in variable but preselected proportions and more particularly relates to a blend control device for controlling the proportion of each of the fluids in the mixture or blend.

A principal object of the present invention is to provide a new and useful blend control device which is adapted for accurately blending the fluids dispensed during each delivery in accordance with the proportions of the fluids preselected for the delivery and irrespective of the proportions of the fluids preselected for the prior delivery.

Another object of the present invention is to provide a new and useful blend control device of the type having a proportioning valve for proportioning the fluids dispensed and which is adapted to accurately control the proportioning valve to provide the preselected blend.

A further object of the present invention is to provide a new and useful blend control device having a compensating device for compensating for blend error occurring when the blend proportions are changed from the preceding delivery during the initial phase of the subsequent delivery while the proportioning valve is being repositioned in accordance with the newly established proportions.

Another object of the present invention is to provide an improved blend control device which not only provides for dispensing two fluids at the appropriate relative flow rates corresponding to preselected proportions but also ensures that the total quantity of each of the fluids delivered is in accordance with the preselected proportions.

A further object of the present invention is to provide an improved blend control device which is entirely automatic in operation.

Another object of the present invention is to provide a blend control device which has a compact and economical assembly of parts, which provides accurate and reliable operation over a long service life, and which may be economically incorporated in either new or existing fluid dispensing apparatus.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a schematic representation of a fluid dispensing apparatus incorporating an embodiment of the blend control device of the present invention;

FIG. 2 is an isometric view, partly broken away, showing an embodiment of a compensating device incorporated in the blend control device of the present invention; and FIG. 3 is a coordinate representation of an exemplary cycle of the blend control device showing the angular operation of (a) a proportioning valve control shaft, (b) an integrator shaft, and (c) a valve setting shaft of the blend control device in relation to the volume of fluid mixture delivered.

Referring now to the drawings in detail, a fuel dispensing apparatus generally of the type described in Wells patent 3,175,414, granted Mar. 30, 1965, is schematically shown in FIG. 1. The illustrated apparatus provides for delivering gasoline through flow lines 10, 12 from separate storage tanks, not shown, containing different grades of gasoline which for convenience will be referred to as "high test" and "low test." A conventional dual type blend or proportioning valve 14 is preferably provided which is adapted to be operated in either of two opposite directions for diminishing the flow in one of the lines 10, 12 and for simultaneously increasing the flow in the other line and for thereby controlling the blend or mixture dispensed.

The proportioning valve 14 is controlled by a subtracting differential 16 having a proportioning valve control shaft 18, hereafter referred to as a blend control shaft. The subtracting differential 16 is operated by flow meters 20, 22 of the usual volumetric type having output shafts 24, 26 which rotate in proportion to the flow of the fluid delivered through lines 10, 12 respectively and which are connected to a summing differential 28. The latter adds the output of the two meter shafts and transmits the combined output through its output shaft 30, a connecting shaft 31, speed change mechanism 32, and a connecting shaft 33 to the subtracting differential 16. It will be understood that the speed-change mechanism 32 includes presettable selective gearing to effect a reduction in speed between shafts 31, 33 such that shaft 33 will rotate at the same rate as the differential input shaft 26 when the flow rates through the meters 20, 22 are in proper ratio, thereby maintaining the blend control shaft 18 in a stationary position.

As described in the referenced patent, the output shaft 30 from the summing differential 28 may also be connected to a quick-change variator 34 for computing the cost of gasoline dispensed in accordance with a unit price preset into the variator for each of the various blends of gasoline which can be dispensed. A register 36 is provided for registering the cost of the fuel delivered as computed by the variator and for registering the quantity of fuel delivered. The variator 34 may be suitably set to compute the cost of the fuel delivered in accordance with the selected blend and if desired, suitable linkage denoted by numeral 38 may be provided as set forth in the referenced patent for resetting the speed-change mechanism 32 when the variator is reset to a different price corresponding to a different blend.

When each delivery of fuel is commenced, the blend control shaft 18 will remain stationary, as noted above, in a position hereafter referred to as a starting or zero position, if the flow rates of the fluids passing through the meters 10, 12 are in a proper ratio corresponding to a selected blend. If the flow rates and thus the meter output shaft speeds are not exactly in the proper ratio, the subtracting differential 16 will provide for rotating the blend control shaft 18 in the appropriate angular direction for repositioning the proportioning valve 14 for providing the preselected flow ratio.

Heretofore, the blend control shaft 18 has been conventionally connected directly to the proportioning valve 14. However, when it was desired to dispense a blend different than that of the prior delivery, a blend error occurred during the initial phase of the subsequent delivery during the time the proportioning valve 14 was being repositioned. The above noted blend error is essentially eliminated in accordance with the present invention by the provision of a compensating device 40 interposed between the blend control shaft 18 and proportioning valve 14.

Referring now to FIG. 2, a preferred embodiment of the compensating device 40 is illustrated having a bevel gear 42 mounted on the blend control shaft 18. Bevel gear 42 constitutes an input drive to a differential 44 having a pair of planetary bevel gears 46, 48 in mesh with bevel gear 42 and coaxially mounted on a shaft 50 supported inside a planetary carrier ring gear 52 whereby angular movement of the blend control shaft 18 is transmitted through the differential 44 to impart a turning movement to a take-off gear 54 in mesh with ring gear 52. The take-off gear 54 is secured on a valve setting shaft 56 shown carrying an arm 58 which in turn has suitable connection means, not shown, linked to the valve 14 for effecting valve adjustment as determined by the angular movement of shaft 56.

A pinion 60 is also secured for rotation on blend control shaft 18 for imparting angular movement to a gear 62 through an idler gear 64 to simultaneously rotate a shaft 66 having bearings 68, 70. The outer end of shaft 66 is provided with a worm 72 which meshes with a rack 74 having guide slots 76, 78 and which is reciprocably mounted in bearing pins 80, 82. The rack 74 includes a pair of downwardly projecting fingers 84, 86 for receiving therebetween a portion of a friction wheel 88 which is mounted on a splined shaft 90 having bearings 92, 94 so that the friction wheel 88 can shift axially along the shaft 90 and rotate the same.

The shaft 90 is positionally arranged to extend diametrically of a driven friction disk 96 the upper surface of which bears against a lowermost peripheral portion of the friction wheel 88. The friction disk 96 may be provided with any suitable driving means such as a constant speed motor or, as illustrated in the preferred embodiment, may be driven by the output shaft 30 of the summing differential 28.

A drive gear 98 is rotatably secured to splined shaft 90 and is in meshing engagement with an idler gear 100 which in turn meshes with a driven gear 102 fixed on a shaft 104, hereafter referred to as an integrator shaft, having a bevel gear 106 at one end thereof comprising a second input to the differential 44.

In normal operation, the blend control shaft 18 is at its "zero" position, and the friction wheel 88 is located in dead-center position on the upper surface of friction desk 96 whereby the wheel 88 will not be rotated by the disk 96. Upon starting pumping fuel at the beginning of a dispensing operation for a selected blend different than that of the prior delivery, the blend control shaft 18 is rotated by the subtracting differential 16 whereupon a first gear train comprising gears 60, 64, 62 provides for displacing rack 74 and wheel 88 a distance proportional to the angular displacement of the blend control shaft 18. Wheel 88 is thereby positioned radially outwardly of its dead-center position and coacts with disk 96 to turn shaft 90 at a progressively increasing rate. A second gear train comprising gears 98, 100, and 102 provides an additional input to the differential 44 through the bevel gear 106 on the integrator shaft 104 which is dependent on the radial displacement and the direction of displacement of wheel 88 from the center of disk 96. The combined inputs from the blend control shaft 18 and the integrator shaft 104 are then transmitted from the differential 44 through its ring gear 52 and the take-off gear 54 to the valve setting shaft 56 to reset the valve 14.

The drive ratio between the blend control shaft 18 and the integrator shaft 104 is therefore dependent upon the fixed drive ratios provided by the first and second gear trains described above and the worm and rack connection, together with the variable drive ratios provided by the interengagement of the friction wheel and friction disk.

During the time blend control shaft 18 is angularly displaced from its original "zero" position, regardless of the angular direction of its initial displacement, integrator shaft 104 continuously provides differential 44 an additional input, hereafter referred to as a supplementary input which is additive to that differential input initially applied by the blend control shaft 18 resulting in an increased combined output to the valve setting shaft 56. Valve 14 is thereby caused to first move past an adjusted position providing the proper flow rate ratio, for at the time such ratio is attained, wheel 88 is displaced radially outwardly of its dead-center position on disk 96 to provide a continued angular adjustment to valve setting shaft 56.

As valve 14 moves past its adjusted position corresponding to the proper flow rate ratio, an output is effected by the meter controlled subtracting differential 16 which rotates the blend control shaft 18 in the opposite angular direction causing wheel 88 to move radially inwardly toward the center disk 96. During the time blend control shaft 18 is being returned in the opposite angular direction to its "zero" position, the integrator shaft 104 continues to rotate at a gradually diminishing rate in a direction corresponding to its initial angular movement and thereby continues to impart its supplementary input to the differential 44.

The net output of differential 44, from the combined input of the blend control shaft 18 and the integrator shaft 104 rotating in opposite angular directions, gradually returns the valve setting shaft 56 to cause the proportioning valve 14 to move into its properly adjusted position for steady state delivery of the fluids in a desired mixture which, with proper machine design and selection of the drive ratio between shafts 18 and 104, will occur substantially simultaneously with the return of blend control shaft 18 to its original "zero" position and wheel 88 once again positioned dead-center on disk 96.

The above-described angular adjustment of the blend control shaft 18 and the integrator shaft 104, together with the resultant angular adjustment of the valve setting shaft 56 is shown in FIG. 3 in connection with a representative change in the proportioning of the fluids being dispensed.

Assuming that blend control shaft 18 is initially rotated in a clockwise direction from its "zero" position to increase the flow of high test in line 12 and simultaneously decrease the flow of low test in line 10, the cross-hatched area denoted as $A_1$ graphically represents the volumetric shortage of high test and the excess low test delivered during the initial phase of a dispensing operation during which time the valve setting shaft 56 is rotated to reposition proportioning valve 14 to an adjusted position corresponding to a desired mixture.

By virtue of the above-described structure, controlled overshifting of the proportioning valve 14 is effected whereby an added measure of high test and a correspondingly smaller quantity of low test will be delivered, as represented by the cross-hatched area denoted as $A_2$, after the appropriate ratio of flow rates is initially attained and during the time the control shaft 18 and wheel 88 are being returned to their original starting positions and accordingly position the valve setting shaft 56 so as to set valve 14 in position corresponding to the desired mixture. The initial shortage of high test and excess low test is thus integrated with the resultant excess high test and shortage of low test to virtually eliminate the above mentioned blend error.

The compensating device 40 will accordingly correct flow line disturbances in either one or both of lines 10, 12 and will always do so such that the net angular displacement of the blend control shaft 18 from its original "zero" position during valve adjustment is zero. The net radial displacement of the wheel 88 relative to the center disk 96 is likewise zero during valve adjustment.

If one of the fluids were to be selected to be dispensed to the exclusion of the other fluid, the normal valve operating mechanism would be suitably disengaged and the valve would be appropriately set prior to the delivery, for example, automatically upon setting of the variator.

From the above description it will be apparent that the apparatus of the present invention provides improved operating characteristics in automatically dispending different blends of fluids not only in a proper flow ratio but also in a precisely accurate total quantity ratio. The compensating device may be designed to provide minimal hunting and yet appropriate sensitivity so as to quickly compensate for blend error occurring at the initial phase of the delivery. Moreover, it will be seen that a device of the above-described type may be readily incorporated in an economical and compact assembly capable of precision operation for use in either new or existing fluid dispensing ing apparatus.

As will be apparent to persons skilled in the art, various modifications and adaptations of the structure above-described will become readily apparent without departure from the spirit and scope of the invention, the scope of which is defined in the appended claims.

I claim:

1. For use in a fluid dispensing apparatus having two fluid flow lines with a fluid meter in each line and adjustable valve means for controlling the dispensing of fluid from each line in variable proportions in accordance with a predetermined flow rate ratio, a variable blend control comprising meter controlled means movable in response to a variance between the ratio of flow rates through the meters and a predetermined flow rate ratio, and a compensating device responsive to the operation of the meter controlled means and operable to first move the valve means past an adjusted position effecting said predetermined flow rate ratio and then automatically return the valve means to said adjusted position for ensuring a proper total quantity ratio of the fluids being dipensed.

2. The blend control of claim 1 wherein the compensating device includes a driven friction disk, a rotary shaft extending diametrically of the disk, a friction wheel rotatably fixed to the shaft and bearing against the disk, the wheel being mounted on the shaft for axial movement radially outwardly of the center of the disk in proportion to displacement of the meter controlled means from a starting position thereof whereby the wheel coacts with the disk to produce a turning movement of the shaft in proportion to the radial displacement of the wheel from the center of the disk, and drive means connected to the shaft for operating the valve means.

3. The blend control of claim 1 wherein the meter controlled means includes a rotary drive member constituting a first valve operator rotatable in opposite angular directions relative to a starting position indicative of said predetermined flow rate ratio for effecting valve adjustment in accordance with a difference between said predetermined flow rate ratio and an actual ratio of flow rates through the meters, and wherein the compensating device includes a second valve operator drivingly connected to the first valve operator for simultaneous operation therewi.h in effecting supplementary valve adjustment for ensuring a proper total quantity ratio of the fluids being dispensed.

4. The blend control of claim 1 wherein the compensating device further includes a differential having first and second rotary input drives and an output drive combining the same and connected to automatically actuate the valve means, the first input drive being connected to the meter controlled means and rotatable from a starting position first in one angular direction while the proportioning valve is being moved into its said adjusted position and then in the opposite angular direction, and the second input drive being operable in response to the operation of the first input drive for continuously imparting a supplementary input to the differential corresponding in kind to the initial input of the first input drive while it is angularly displaced in said one angular direction from its said starting position.

5. The blend control of claim 2 wherein the meter controlled means includes a rotary drive member rotatable in opposite angular directions relative to said starting position, and wherein a drive is provided between the rotary drive member and the friction wheel including a worm and rack connection for imparting a linear movement to the wheel axially of the shaft in proportion to the angular displacement of the rotary drive member from said starting position.

6. The blend control of claim 3 further including a differential having an output connected to adjust the valve means in accordance with the combined outputs of the first and second valve operators.

7. The blend control of claim 4 wherein the second input drive further includes a variable speed drive for producing a turning movement in proportion to the angular displacement of the first input drive from said starting position for effecting said supplementary input to the differential.

8. The blend control of claim 4 wherein the meter controlled means includes a common drive means connected to both the first and second input drives for simultaneous operation of the same.

9. The blend control of claim 4 wherein the net angular displacement of the first input drive from said starting position during valve adjustment is zero.

10. The blend control of claim 5 wherein the net angular displacement of the rotary drive member from said starting position during valve adjustment is zero, and wherein the net radial movement of the friction wheel relative to the center of the friction disk during valve adjustment is zero.

11. The blend control of claim 8 wherein the first input drive is rotatable by the common drive means from said starting position through an angular displacement first in one angular direction sufficient to ensure that the valve means reaches its said adjusted position before the first input drive is returned in the opposite angular direction to said starting position by the common drive means.

12. An apparatus for simultaneously dispensing two fluids in variable proportions comprising a fluid flow line for each fluid and a fluid meter in each line, adjustable valve means for simultaneously varying the proportions of the two fluids, and a variable blend control operated by the meters and presettable for effecting a predetermined ratio of flow rates through the meters, the blend control including a compensating device connected to adjust the valve means when the ratio of flow rates through the meters varies from said predetermined flow rate ratio, the compensating device being operable to first move the valve means past an adjusted position effecting said predetermined flow rate ratio and then automatically return the valve means to said adjusted position for ensuring a proper total quantity ratio of the fluids being dispensed in accordance with said predetermined ratio of flow rates.

13. The apparatus of claim 12 including a differential combining the outputs of the meters, and wherein the blend control further includes a presettable speed-change mechanism connected to an output of the differential, and a second differential having an output member connected to operate the compensating device in accordance with a difference in the outputs of the speed-change mechanism and one of the meters.

14. The apparatus of claim 12 wherein the blend control further includes a drive member rotatable in opposite angular directions relative to a starting position indicative of said predetermined flow rate ratio, and wherein the compensating device includes a valve operator responsive to the operation of the drive member for effecting valve adjustment.

15. The apparatus of claim 12 wherein the blend control includes a valve operator operable for adjusting the valve means, and wherein the compensating device includes a second valve operator responsive to operation of the first valve operator for effecting supplementary adjustment of the valve means, the first and second valve operators cooperating to first move the valve means past an adjusted position effecting said predetermined flow rate ratio and then automatically return the valve means to said adjusted position for ensuring a proper total quantity ratio of the fluids being dispensed.

16. The apparatus of claim 14 wherein the net angular displacement of the drive member from said starting position during valve adjustment is zero.

17. The apparatus of claim 15 further including a differential having an output connected for adjusting the valve means in accordance with the combined outputs of said first and second valve operators.

18. The apparatus of claim 15 wherein the second valve operator is continuously operable in a first angular direction for effecting a supplementary valve adjustment while the first valve operator is displaced from said starting position in one angular direction, and wherein the second valve operator is continuously operable in a second angular direction for effecting a supplementary valve adjustment while the first valve operator is displaced from said starting position in an angular direction opposite said one angular direction.

References Cited

UNITED STATES PATENTS

| | | | |
|---|---|---|---|
| 2,880,908 | 4/1959 | Young | 222—26 |
| 2,931,538 | 4/1960 | Young et al. | 137—98 X |
| 3,152,724 | 10/1964 | Jauch et al. | 222—26 |
| 3,175,414 | 3/1965 | Wells | 74—354 |

STANLEY N. GILREATH, *Primary Examiner.*

U.S. Cl. X.R.

74—691; 222—26, 52